(12) United States Patent
Maier et al.

(10) Patent No.: US 8,182,681 B2
(45) Date of Patent: May 22, 2012

(54) OIL FILTER ASSEMBLY

(75) Inventors: Jan Maier, Moessingen (DE); Matthias Knoell, Bad Urach (DE); Friedhelm Pfitzer, Rangendingen (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 644 days.

(21) Appl. No.: 12/373,896

(22) PCT Filed: May 19, 2007

(86) PCT No.: PCT/EP2007/004475
§ 371 (c)(1),
(2), (4) Date: Jun. 17, 2009

(87) PCT Pub. No.: WO2008/009323
PCT Pub. Date: Jan. 24, 2008

(65) Prior Publication Data
US 2011/0042293 A1 Feb. 24, 2011

(30) Foreign Application Priority Data

Jul. 21, 2006 (DE) .......................... 10 2006 034 485
Feb. 9, 2007 (DE) ..................... 20 2007 002 162 U (51) Int. Cl.
*B01D 35/16* (2006.01)
*B01D 27/08* (2006.01)

(52) U.S. Cl. ......... 210/235; 210/248; 210/443; 210/232

(58) Field of Classification Search .................. 210/232, 210/235, 248, 443
See application file for complete search history.

(56) References Cited

U.S. PATENT DOCUMENTS

| 5,814,215 A | * | 9/1998 | Bruss et al. .................... 210/130 |
| 6,558,536 B2 | * | 5/2003 | Jainek et al. ................... 210/184 |
| 6,685,829 B1 | * | 2/2004 | Baumann et al. ............. 210/232 |
| 6,811,694 B2 | * | 11/2004 | Jainek ........................... 210/248 |

FOREIGN PATENT DOCUMENTS

| EP | 1 479 427 | 11/2004 |
| EP | 1 616 612 | 1/2006 |
| JP | 2000 288317 | 10/2000 |

* cited by examiner

*Primary Examiner* — Thomas M Lithgow
(74) *Attorney, Agent, or Firm* — Paul Vincent (57) ABSTRACT

An oil filter assembly (10) has a receiving chamber that can be closed by a cover element and a spring-loaded supporting tube (22) that is fixed in the receiving chamber (18) and is designed to receive a filter element (20) that can be radially traversed by oil, the supporting tube being axially displaceable between an operating position and a drain position in such a way that, in the operating position when the receiving chamber is closed by the cover element (14), the tube closes a drain opening (42) and when the receiving chamber is open in the drain position, the tube releases a drain opening (42). The cover element (14) has a supporting tube contact area (58) on the side facing the receiving chamber in such a way that during the closing of the receiving chamber (14) when the filter element is located on the supporting tube (22), pressure is exerted on the tube by the support tube contact area (58), thus displacing the tube into the operating position.

20 Claims, 6 Drawing Sheets

OIL FILTER ASSEMBLY

This application is the national stage of PCT/EP2007/004475 filed on May 19, 2007 and claims Paris Convention Priority to DE 10 2006 034 485.0 filed Jul. 21, 2006 and to DE 20 2007 002 162.3 filed Feb. 9, 2007.

BACKGROUND OF THE INVENTION

The invention concerns an oil filter assembly having a receiving chamber that can be closed by a cover element, and a supporting tube that is fixed in the receiving chamber and is spring-loaded for receiving a filter element through which oil can flow in a radial direction, wherein the supporting tube is displaceably disposed in the axial direction between an operating position and a drain position such that, in the operating position, in which the cover element closes the receiving chamber, it closes a drain opening, and in the drain position, when the receiving chamber is opened, it opens a drain opening. In an oil filter assembly of this type, the supporting tube is fixed to the receiving chamber in such a fashion that it remains in the housing when the filter element is exchanged. The receiving chamber can thereby be closed by the cover element e.g. by screwing on the cover element, or by swinging or latching it onto the receiving chamber. A spring element may, in particular, be provided to spring-load the supporting tube towards the drain position. The spring element may thereby be supported directly on the supporting tube and also on a housing that forms the receiving chamber.

WO01/17657 A2 (=EP1137470 A2) discloses an oil filter assembly, in which a drain dome is disposed together with a filter insert between a first position in which a drain line is closed, and a second position in which the drain line is opened, such that they can be axially moved, wherein the drain dome is fixed to the filter housing and is urged into its open position by the force of a spring. The drain dome is thereby moved against the action of the spring into its closed position by means of the filter insert that is inserted into the filter housing.

EP 1 106 795 A1 (=DE 600 18 360 T2) discloses a fluid filter having a closing element that is suited to enter into a drain channel when a cover of the filter insert closes the receiving chamber, thereby closing the channel. However, the closing element opens the drain channel when the filter insert is removed from the receiving chamber. A stop is provided on the filter insert, which cooperates with the closing element to keep it in the operating position when the cover element is closed in order to retain the closing element in the operating position. In both, WO01/17657 A2 and EP 1 106 795 A1, the filter element must disadvantageously have a certain inherent rigidity in order to keep the drain dome or the closing element in the operating position against the spring load.

It is the underlying purpose of the present invention to further develop an oil filter assembly of the above-mentioned type and thereby eliminate the disadvantages of prior art devices. In particular, an oil filter assembly is to be provided, which can be reliably operated and facilitates exchange of the filter element. The construction of the filter element itself should thereby be as simple as possible.

SUMMARY OF THE INVENTION

This object is achieved by an oil filter assembly comprising the features of the independent claim. In the inventive oil filter assembly, the cover element has a supporting tube abutment area on its side facing the receiving chamber such that, when the filter element is disposed on the supporting tube, the supporting tube is directly loaded by the supporting tube abutment area and displaced into the operating position when the receiving chamber is being closed. In contrast to prior art, the supporting tube is consequently immediately directly brought into the operating position by the cover element via its supporting tube abutment area when the cover is being closed. The supporting tube is thereby directly displaced into the operating position via the cover element that acts against the supporting tube and not via the filter element. This is advantageous in that the filter element itself does not need to have a high intrinsic rigidity and may therefore have a relatively simple construction. In particular, the filter element does not require any components that transmit forces in the axial direction. Prior art devices have shown that, when filter elements are used on a long-term basis, their intrinsic rigidity in the axial direction can decrease, which could cause the supporting tube to be unintentionally displaced into the drain position. In accordance with the invention, it is therefore decisive that the filter element does not retain the supporting tube in its operating position.

The above-mentioned object is also achieved by an oil filter assembly comprising the following features. The cover element preferably has a supporting tube abutment area on its side facing the receiving chamber. When the filter element is disposed on the supporting tube and the receiving chamber is closed, the supporting tube abutment area directly keeps the supporting tube in the operating position. The supporting tube abutment area is consequently used to keep the supporting tube in its operating position during operation of the oil filter assembly. This is also advantageous in that, during operation of the oil filter assembly, the filter element must not transmit any axial forces in order to keep the supporting tube in the operating position. For this reason, the construction of the filter element is facilitated compared to conventional oil filter assemblies.

The supporting tube may naturally have functional components at its free end, wherein the functional components of the supporting tube then cooperate with the supporting tube abutment area. One suitable functional component is, in particular, an overpressure valve that opens when the filter element is clogged and the pressure consequently increases in the area of the unfiltered oil side. The oil can then pass the oil filter assembly without being filtered.

For an advantageous cooperation between the supporting element and the cover element during closing of the receiving chamber, or when the receiving chamber is closed, the supporting tube may project in the direction towards the cover when the filter element is disposed on the supporting tube. This forms an advantageous engagement surface for the supporting tube abutment area of the cover.

In accordance with a further embodiment of the invention, the cover element may have, in addition to the supporting tube abutment area, a filter element abutment area such that the filter element is displaced directly by the filter element abutment area into an operating position on the supporting tube while the receiving chamber is being closed. If the fitter element is not pushed far enough onto the supporting tube when the filter element is changed, the supporting tube is displaced into its operating position when the receiving chamber is being closed. When the cover is closed, the filter element is in its operating position, and in the operating position of the supporting tube, it is preferably disposed such that substantially no axial forces are transmitted via the filter element.

It is thereby feasible for the supporting tube abutment area and the filter element abutment area to be located in different planes in the axial direction and/or for the supporting tube abutment area to be disposed on the cover element in a radial further inward position than the filter element abutment area. This is advantageous in that the supporting tube abutment area is provided in the cover element at a clear separation from the filter element abutment area.

The supporting tube abutment area may thereby be formed, in particular, by end faces, facing the supporting tube, of webs or longitudinal ribs that extend in the axial direction in the inside of the cover. This is advantageous in that, when an overpressure valve is disposed at the free end of the supporting tube, oil can flow between the webs or longitudinal ribs to the inlet of the overpressure valve.

The filter element abutment area may also be formed by correspondingly designed webs or ribs that are disposed on the cover and project in a radially inward direction such that oil can flow between these ribs around the filter element and to the valve inlet of the overpressure valve.

Axially extending connecting pins may be provided, in particular, in the area of the bottom of the receiving chamber for movably fixing the supporting tube in the receiving chamber, and cooperate with pin recesses provided on the supporting tube, wherein the pin recesses are disposed on feet that project in a radially outward direction or on a collar of the supporting tube that projects in a radially outward direction and is circumferential at least in sections. Forces that act in a transverse direction onto the supporting tube or on the filter element disposed onto the supporting tube, can advantageously be diverted to the housing due to these feet or this collar. Moreover, the supporting tube can advantageously be permanently fixed in the housing. For mounting the supporting tube, the supporting tube can be introduced in the axial direction into the receiving chamber such that the connecting pins are immersed into the pin recesses. For permanent fixation of the supporting tube in the receiving chamber, the connecting pins may be designed, in particular, as snap-on or latching pins, which engage behind the areas that surround the pin recesses after insertion of the supporting tube. It is also feasible to design the connecting pins as riveting pins, in particular as welding rivet pins. The riveting pins can be hot riveted after insertion of the supporting tube to yield a suitable connection between the supporting tube and the housing.

The supporting tube may thereby be detachably connected in the receiving chamber via the connecting pins. Towards this end, the pin recesses may be designed, in particular, like a bayonet. The supporting tube may then be inserted in the axial direction into the receiving chamber such that the connecting pins engage in the pin recesses. In a further step, the free ends of the connecting pins can be hot riveted. If the supporting tube shall be removed from the receiving chamber at a later time, it can be turned about its longitudinal center axis until the rivet heads reach the areas of the pin recesses that have a cross-sectional surface that is larger than the diameter of the hot riveting heads. The supporting tube can then be removed from the receiving chamber in an axial direction.

Instead of hot-riveted connecting pins, one can also use connecting pins in the form of screws having a widening that corresponds to a hot riveting head.

The housing that forms the receiving chamber may thereby be formed, in particular, from plastic material, wherein the connecting pins may, in particular, be formed on the housing.

If the connecting pins have a widening in the area of their free ends, the separation between the bottom of the receiving chamber and the lower edge of the widening advantageously is, in particular, at least slightly larger than the axial thickness of the feet or collar. This enables displacement of the supporting tube in the axial direction from the operating position into the drain position within the receiving chamber.

As mentioned above, the mushroom head-like widening can be produced, in particular, through hot riveting after insertion of the supporting tube and thereby of the pin recesses into the connecting pins.

It is also feasible to design the pin recesses such that the supporting tube can be turned about its center axis through a defined angle of rotation. The pin recesses may be designed, in particular, like ring segments or, as mentioned above, like a bayonet. The areas of a pin recess that are disposed opposite to each other coaxially along the center longitudinal axis then form rotary stops for limiting the angle of rotation. Due to the fact that the supporting tube can be turned about its longitudinal axis at least to a certain degree, it is possible to open a seal, which is disposed e.g. on the supporting tube side and is stuck in the area of the drain opening, by turning it. It may thereby be sufficient to turn the supporting tube through an angle of rotation of approximately 5° to 15°.

In order to enable rotation of the supporting tube, carrier sections, in particular, in the form of carrier ribs, may be provided on the cover element, which can turn the supporting tube and/or the filter element, in particular, for screwing on or unscrewing the cover element. These carrier sections may be provided on or formed by, in particular, the filter element abutment area or the supporting tube abutment area. Recesses may be provided on the supporting tube or on the filter element, which cooperate with the respective carrier sections, for engagement with the carrier sections on the side of the cover element.

In accordance with a further embodiment of the invention, the supporting tube may have an extension section on the side facing away from the cover element and in the area that is not covered by the filter element, which is closed in the radial direction, engages in a purified oil space having an oil outlet, and has at least one purified oil outlet opening in its area facing away from the cover element. Purified oil filtered by the filter element may consequently be discharged through the extension section of the supporting tube into the purified oil chamber and from there into the oil outlet.

The area of the supporting tube that is covered by the filter element has openings in the radial direction through which purified oil filtered by the filter element can flow into the supporting tube. The filter element is advantageously supported on the supporting tube in a directly sealing fashion in the area of its end caps.

A circumferential sealing collar that projects in the radial direction may be formed on the extension section for sealing the purified oil chamber with respect to the receiving chamber that receives the unfiltered crude oil.

A closing section, which is disposed in the area of the center longitudinal axis for closing the drain opening in the operating position, may advantageously be provided at the free end of the extension section of the supporting tube. The spring element, which loads the supporting tube into the drain position, may thereby be disposed around the extension section of the supporting tube in the purified oil chamber.

In another advantageous fashion, an engagement section is provided on the side of the cover element facing the receiving chamber for engagement behind filter element sections such that the filter element can be removed from the supporting tube and from the receiving chamber by means of the cover element. The engagement sections may thereby be formed by the filter element abutment area. The filter element sections may thereby be formed, in particular, by the end disc, if provided, of the filter element, which faces the cover.

In order to ensure that the engagement sections automatically engage when the cover element is screwed onto the housing, the engagement sections advantageously have insertion slopes on their side facing the filter element.

The engagement sections may thereby be formed, in particular, as spring tabs that extend parallel to the center longitudinal axis of the filter element and project from the cover element. The spring tabs may have engagement surfaces that project in a radial inward direction for engagement behind the filter element sections. This design is advantageous in that the engagement sections that are formed like spring tabs yield in a radial outward direction when the cover element is screwed onto the housing and then snap behind the filter element sections in a radially inward direction for engagement.

In another embodiment of the invention, the engagement sections are designed as webs that are disposed on the cover and have an edge that extends substantially parallel to the center longitudinal axis of the filter element. The edge has a recess extending in the radial direction for engagement behind the filter element sections. In this embodiment, the engagement sections are consequently, in particular, not elastic in a radial outward direction. An assembly of this type may be used, in particular, when the filter element sections are elastic in an axial inward direction such that they yield when joined with the cover.

Further details and advantageous embodiments of the invention can be extracted from the following description by means of which the embodiments shown in the figures are described and explained in more detail.

BRIEF DESCRIPTION OF THE DRAWING

FIG. 2 shows a longitudinal open view of the upper part of the oil filter assembly in accordance with FIG. 1;

FIG. 2.1 shows a section of FIG. 2 of a slightly different embodiment;

DESCRIPTION OF THE PREFERRED EMBODIMENT

Figure 1:
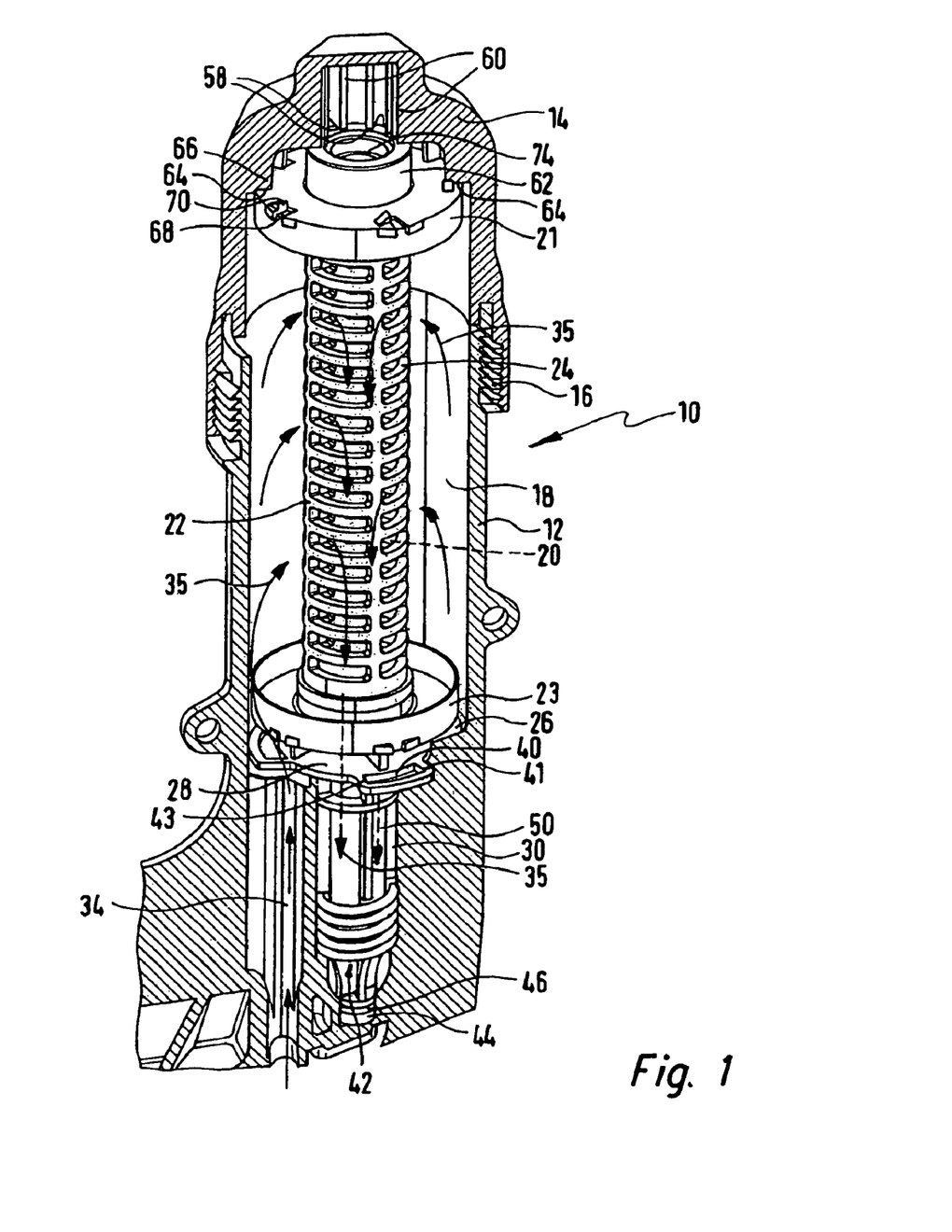
FIG. 1 shows a longitudinal open view of a first oil filter assembly in accordance with the invention.
Figures 2, 21:
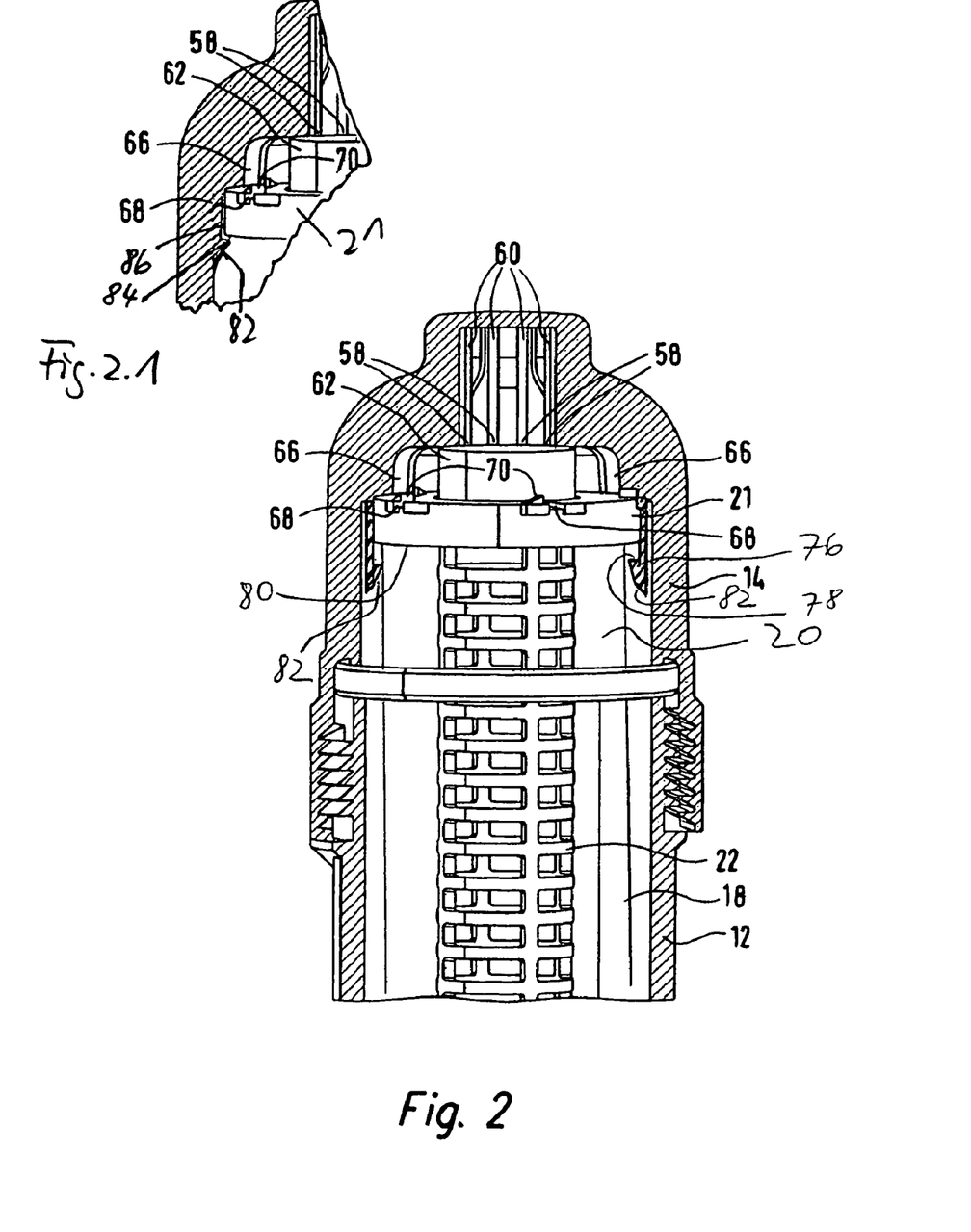

The oil filter assembly 10 shown in FIGS. 1 through 4 comprises a housing 12 that can be closed by a cover 14 via a thread 16. The housing 12 and the cover 14 form a receiving chamber 18 that houses a filter element 20 through which oil can flow in a radial direction. FIGS. 1 and 2 only show the two end caps 21, 23 of the filter element 20 for clear illustration of the function. The filter element 20 is supported by a supporting tube 22 that is can-shaped in the area where it is covered by the filter element 20. A plurality of openings 24 are provided on the supporting tube such that oil can flow through the supporting tube 22 in a radial direction. On its side facing a bottom 26 of the receiving chamber 18, the supporting tube 22 comprises a circumferential annular collar 28 that is oriented in a radially outward direction. It is also possible to merely provide annular collar sections or feet, e.g. as shown in the embodiment in accordance with FIGS. 5 to 7, instead of the annular collar 28.

A purified oil chamber 30 is provided downstream of the receiving chamber 18 in an axial downward direction, the axial end of which has an oil outlet 32. An oil inlet 34 extends within the housing 12 parallel to the purified oil chamber 30, as is clearly illustrated, in particular, in FIGS. 1 and 3, through which unfiltered oil can flow into the receiving chamber 18. The oil flow during operation of the oil filter assembly 10 is indicated by arrows 35 in FIG. 1. During operation of the oil filter assembly 10, oil to be filtered consequently flows from the oil inlet 34 through the filter element 20 and to the oil outlet 32.

The supporting tube 22 is inserted in the axial direction from the top into the receiving chamber 18 and permanently fixed at that location. Towards this end, axially extending connecting pins 38 are provided in the area of the bottom 26, which is clearly shown, in particular, in FIGS. 3 and 4. In the assembled state, these connecting pins 38 project into pin recesses 40 that are provided on the annular collar 28. As is clearly shown in FIG. 1, these pin recesses 40 are formed as ring segments. For mounting the supporting tube 22, it is introduced in an axial direction into the receiving chamber such that the connecting pins 38 are immersed into the pin recesses 40, as is illustrated in FIG. 4.

Figure 3:
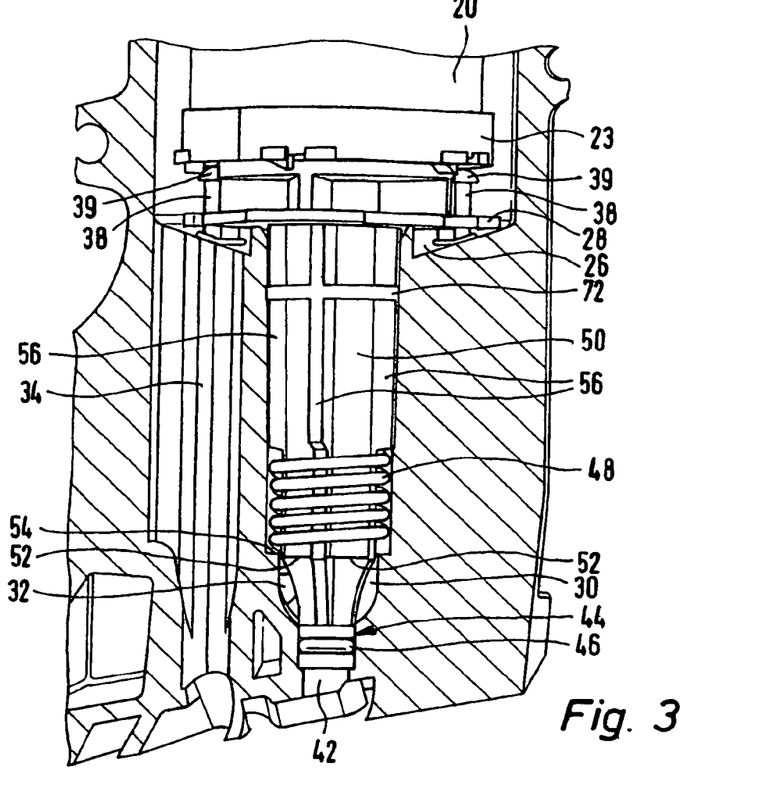
FIG. 3 shows a longitudinal open view of the lower part of the oil filter assembly in accordance with FIG. 1.

After insertion of the supporting tube 22, the free ends of the connecting pins 38 are e.g. thermally deformed to produce mushroom head-like widenings 39 at their free ends, which are clearly shown in FIG. 3. The separation between the bottom 26 of the receiving chamber 18 and the lower edge of the widening 39 is thereby selected such that the supporting tube 22 can be displaced from the operating position shown in FIGS. 1 through 4 to a drain position, in which the areas of the annular collar 28 that surround the recesses 40 come to rest on the lower side of the recesses. In the operating position, a drain opening 42 provided at the lower end of the purified oil chamber 30 is closed by a closing section 44 of the supporting tube 22. The closing section 44 has a circumferential seal 46.

When the cover element 14 is removed, the supporting tube 22 is displaced into the drain position by a spring element 48 that is supported on the housing 12 and also on the supporting tube 22. In the drain position, the areas of the annular collar 28 that surround the recess 40 abut the lower sides of the widenings 39, and the closing section 44 is also moved out of the area of the drain opening 42, such that oil can flow out of the receiving chamber 18 via the drain opening 42.

Figure 4:
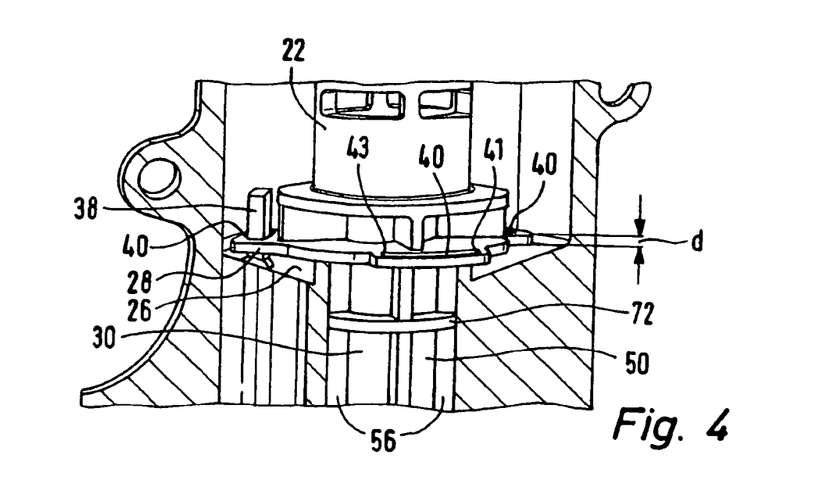
FIG. 4 shows an open view in correspondence with FIG. 3 in an assembly position.

As is clearly shown in FIGS. 1, 3 and 4, the supporting tube has an extension section 50 on the side facing away from the cover element 14, which is closed in the radial direction and engages the purified oil chamber 30. The extension section 50 thereby has a purified oil outlet opening 52 on its side facing away from the cover element 16, out of which filtered purified oil can flow into the purified oil chamber 30. The filtered purified oil consequently flows from the purified oil outlet opening 52 through the purified oil chamber 30 to the oil outlet 32 that follows the purified oil chamber 30 in the radial direction.

As is particularly shown in FIG. 3, the spring element 48 is supported on a shoulder 54 on the purified oil chamber side and also on the end faces of webs 56 of the extension section 50, which extend in the axial direction.

As mentioned above, the supporting tube 22 is in a drain position when the cover element 14 is opened due to the spring pretension of the spring element 48. In order to transfer the supporting tube 22 together with the filter element 20 that is disposed on the supporting tube 22 into the operating position when the cover element 14 is unscrewed, the cover element 14 has a supporting tube abutment area 58 on its side facing the receiving chamber 18. The supporting tube abutment area 58, which is clearly shown, in particular, in FIGS. 1 and 2, is thereby formed by ribs 60 that are disposed on the inside of the cover element and project in a radial inward direction. The end faces of the ribs 60 that extend in the radial direction thereby load the end face of the free end 62 of the supporting tube 22. As is clearly shown, in particular, in FIG. 2, in the operating position, the supporting tube 22 or its free end 62 projects past the filter element 20 or its end cap 21 in an axial direction towards the cover. The supporting tube abutment area 58 also ensures that the supporting tube 22 is held in the operating position when the cover element 14 is closed.

The supporting tube abutment areas 58 are provided on the cover element 14 to ensure that the filter element 20 advantageously does not need to transmit any axial forces, in particular, in the operating position. The load flow that starts from the spring element 48 extends via the supporting tube 22 into the cover element 14.

Filter element abutment areas 64 are provided on the inner side of the cover element 14 in order to dispose the filter element 20 at an exact position on the supporting tube 22. The filter element abutment areas 64 are used to displace the filter element 20 into its operating position when the cover element 14 is screwed on. The filter element abutment areas 64 are thereby also realized by correspondingly disposed ribs 66. The supporting tube abutment areas 58 are, however, disposed radially further inward than the filter element abutment areas 64. The supporting tube abutment areas 58 are located in the axial direction above the filter element abutment areas 64.

After long-term operation of the oil filter assembly, the sealing element 46 or the closing section 44 may stick to the housing. In order to release a stuck closing section 44 or sealing element 46 for opening the cover element, the ribs 60 and/or the ribs 66 may be formed as carrier ribs that also rotate the supporting tube 22 and/or the filter element 20 when the cover element is turned. The angle of rotation of the supporting tube 22, which may, in particular, be approximately 15°, is determined by the length of the pin recesses 40 that extend coaxially to the center longitudinal axis. The coaxial opposite sides of the pin recesses 40 thereby form rotary stops 41, 43 for the connecting pins 38 that engage in the pin recesses 40. A stuck supporting tube 20 can be released by turning, thereby enabling automatic axial movement of the supporting tube 22. In order to also rotate the supporting tube 22 or the filter element 20, carrier recesses 68 or, in particular, wedge-like carrier elevations 70 (shown as example on the end discs 21 and 23) may be provided on the supporting tube 22 and/or on the filter element 20.

In order to prevent undesired flow of unfiltered oil from the receiving chamber 18 along the extension section 50 towards the purified oil chamber 30, a circumferential sealing collar 72 is formed on the extension section 50. The sealing collar 52 thereby acts against the wall of the purified oil chamber 30. The sealing collar 72 is thereby disposed such that it leaves the area of the wall of the purified oil chamber when the supporting tube 22 is axially displaced into the drain position such that unfiltered oil provided in the receiving chamber 18 can freely flow into the purified oil chamber 30 and be discharged from the purified oil chamber 30 via the drain opening 42.

An overpressure valve 74 is disposed at the free end 62 of the supporting tube 22, which faces the cover element 14 (clearly shown in particular in FIG. 1) and opens when the pressure in the receiving chamber 18 is increased such that unfiltered oil can flow to the inner side of the supporting tube 22. Due to the supporting tube abutment areas 58 that are formed as ribs 60, oil can freely flow between the ribs 60 towards the inlet of the overpressure valve 74. Since the filter element abutment areas 64 are also formed like ribs, oil can also freely flow between the filter element 20 and the cover 14 to the valve 74.

Figure 5:
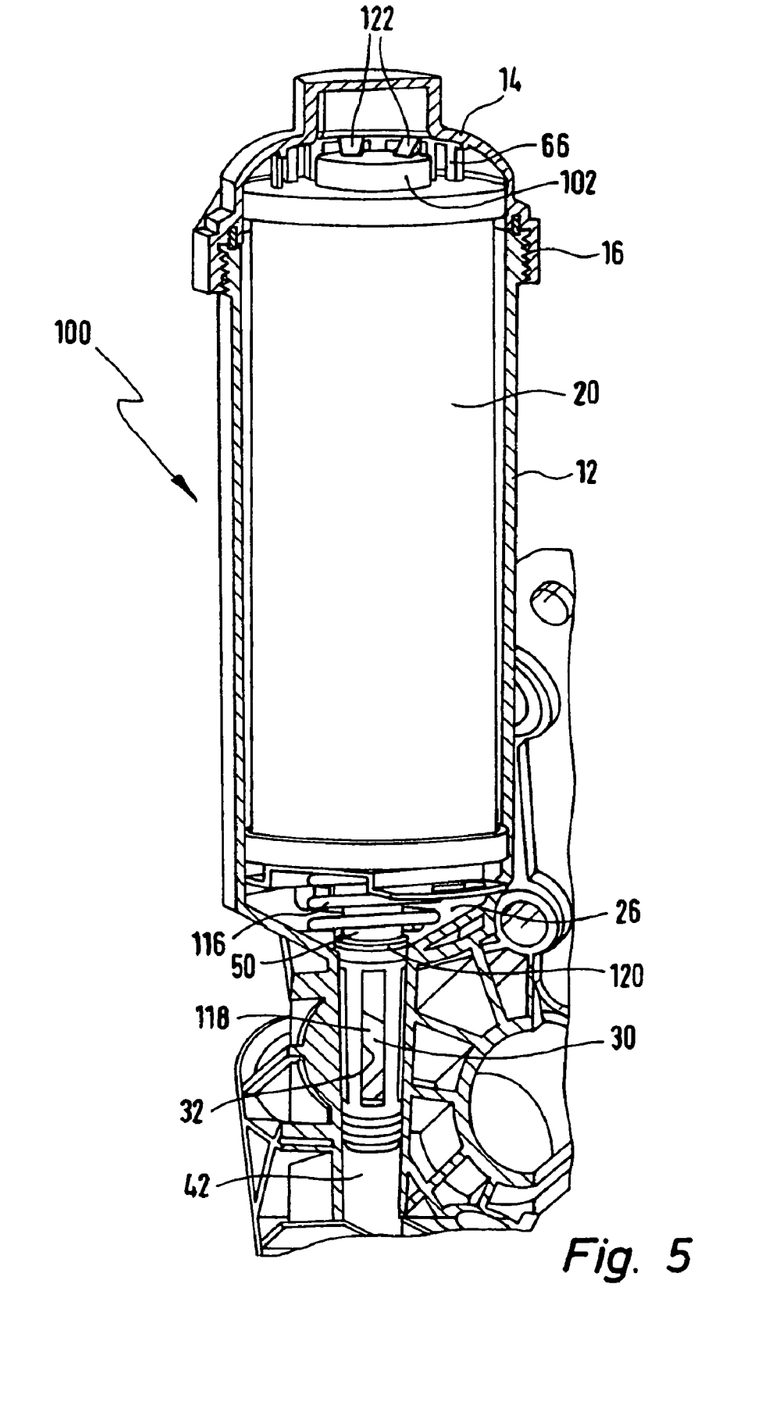
FIG. 5 shows a longitudinal open view of a second inventive oil filter assembly.
Figure 6:
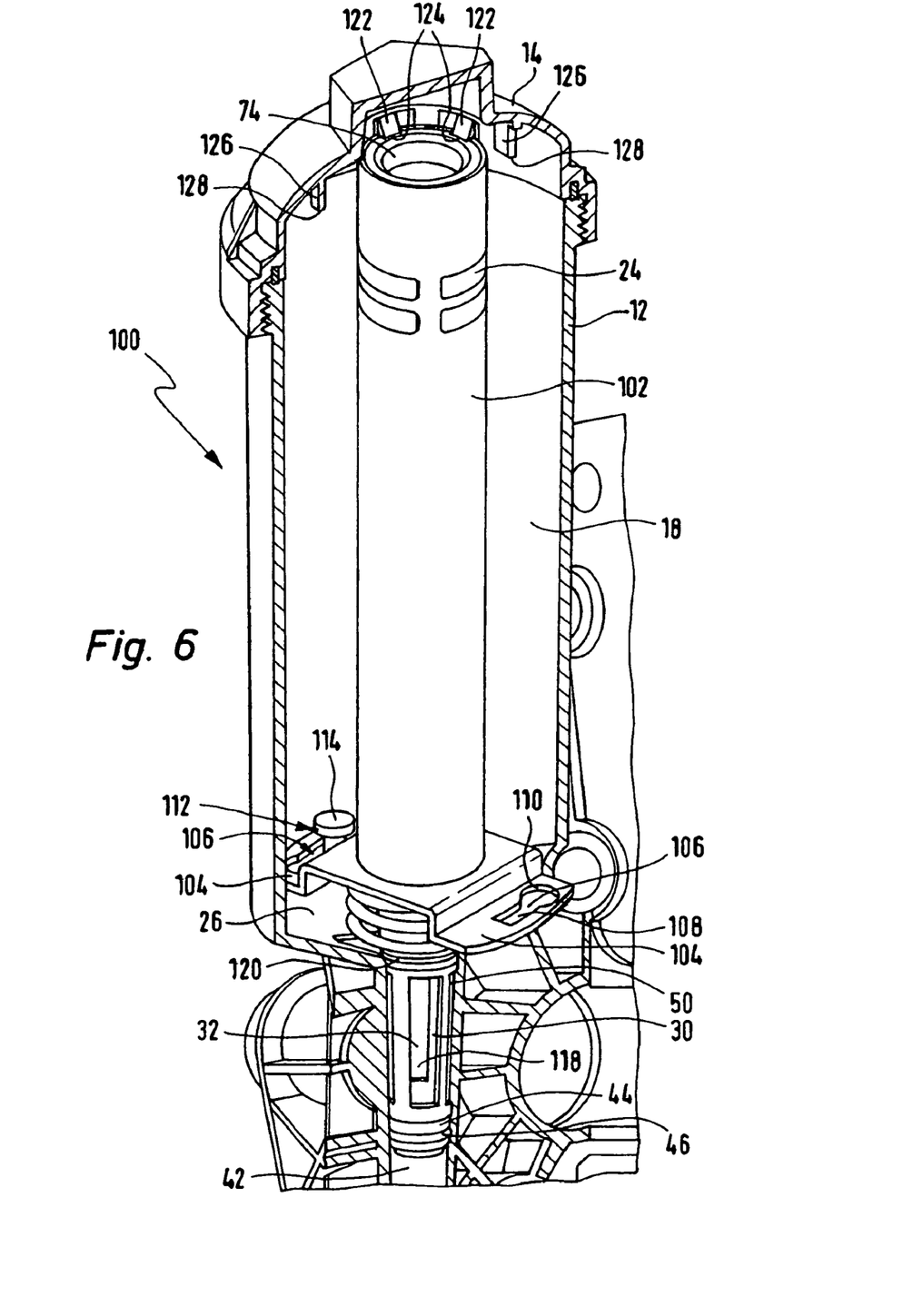
FIG. 6 shows an open view similar to FIG. 5 from another perspective without filter element.
Figure 7:
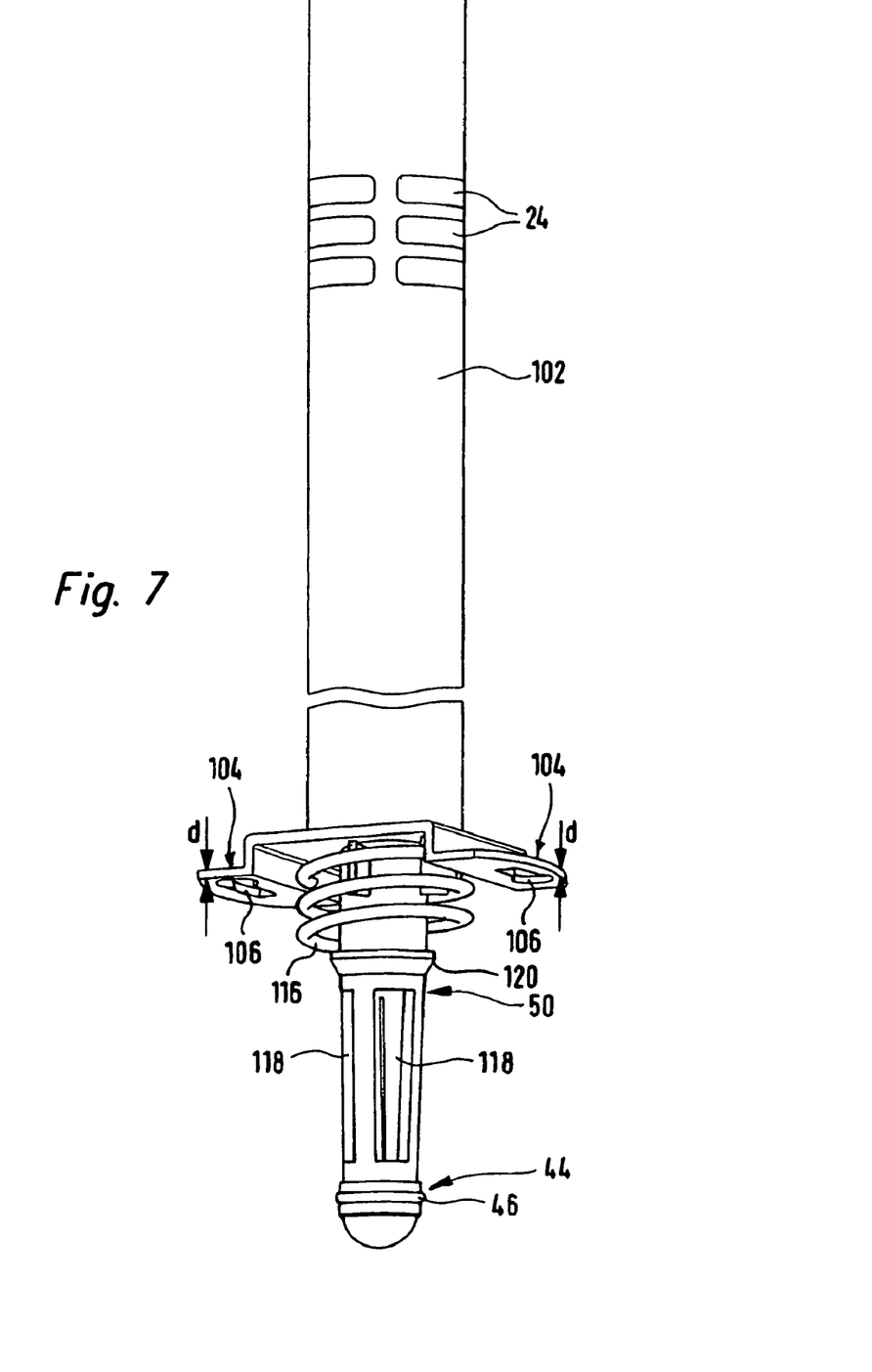
FIG. 7 shows the individual parts of the supporting tube of FIGS. 5 and 6.

FIGS. 5 through 7 show a second inventive oil filter assembly 100, wherein the components that correspond with the oil filter assembly 10 in accordance with FIGS. 1 through 4 are designated by the corresponding reference numerals.

Mounting sections in the form of feet 104 that project in a radial outward direction are provided on the supporting tube 102 of the oil filter assembly 100, as is clearly shown in FIGS. 6 and 7. The feet 104 have bayonet-shaped pin recesses 106, which have a ring segment section 108 that extends about the center longitudinal axis of the supporting tube 102, and a circular ring section 110 that joins the ring segment section 108.

As is clearly shown, in particular, in FIG. 6, connecting pins 112 are provided on the bottom 26 of the receiving chamber 18, the free ends of which comprise a mushroom head-like widening 114. The diameter of each mushroom head-like widening 114 is at least slightly smaller than the clear area of the circular ring section 110 and larger than the width of the respective ring segment section 108. For this reason, the supporting tube 102 can be disposed such that it remains in the receiving chamber 18 like a bayonet.

The connecting pins 112 may e.g. be made from plastic material, wherein the connecting pins 112 may initially be cylindrical and obtain their mushroom head-like widening 114 only after insertion of the supporting tube 102, e.g. through hot riveting.

In accordance with the invention, the connecting pins 112 may e.g. also be realized in the form of screws having corresponding screw heads, which can be screwed into the housing.

In the oil filter assembly 100 in accordance with FIGS. 5 through 7, the separation between the bottom 26 of the receiving chamber 18 and the lower edge of the widening 114 is approximately two to ten times and, in particular, approximately 5 times as large as the axial thickness d of the two feet 104. This realizes a limited motion of the supporting tube 102 in the axial direction. Towards this end, the supporting tube 102 can be axially displaced from an operating position assumed when the receiving chamber 18 is closed, into a drain position assumed when the receiving chamber 18 is open or the cover 14 is removed. For automatic displacement of the supporting tube 102 from the operating position into the drain position, a spring element 116 is provided which is supported on the bottom 26 of the receiving chamber 18 and also on the supporting tube 102 or the side of the feet 104 facing the bottom 26.

As is clearly shown in FIGS. 5 and 6, the supporting tube 102 engages a purified oil chamber 30 on the side facing away from the filter element 20 or the cover 14. The supporting tube 102 has purified oil outlet openings 118 in the section of the supporting tube 102, which is entirely disposed in the purified oil chamber 30 in the operating position shown in FIGS. 5 and 6. On the side facing the feet 104, the purified oil outlet openings 118 are followed by a circumferential sealing collar 120. In the operating position shown in the figures, the sealing collar 120 sealingly acts against a housing section that corresponds to the sealing collar 120 in the transition area between the receiving chamber 18 and the oil outlet 32. In the operating position, the filtered oil that flows through the filter element 20 in a radial direction, flows via the oil outlet 32 out of the oil filter assembly 100 to the user.

When the housing cover 14 is opened, the supporting tube 102 is displaced in an axially upward direction by the spring element 116 until the feet 104 abut the lower side of the widenings 114. In this drain position, the purified oil outlet openings 118 communicate with the receiving chamber 18 such that the oil that is present in the receiving chamber 18 flows into the purified oil chamber 30 via the purified oil outlet openings 118 and further into the drain opening 42.

The supporting tube 102 has openings 24 (indicated in FIG. 7) in the area where it cooperates with the filter element 20, through which oil can flow in a radial direction.

Wedge-like webs 122 are formed on the inner side of the cover element 14, the sides of which facing the free end of the supporting tube 102 form support tube abutment areas 124. The supporting tube 102 is transferred into the operating position via these supporting tube abutment areas 124 when the cover element 14 is screwed onto the housing 12, and held in the operating position when the cover element 14 is screwed on. Projections 126 that extend in the axial direction are moreover provided on the inner side of the cover element 14, the free ends of which form filter element abutment areas 128. The filter element 20 is pushed via the filter element abutment areas 128 into the intended operating position when the cover element 14 is screwed on. The spring force of the spring element 116, which loads the supporting tube 102 into the drain position is, however, exclusively diverted into the cover element 14 via the supporting tube abutment sections 126.

As is clearly shown in FIG. 2, engagement sections 76 may be provided on the cover element 14, which engage behind the upper end cap 21 of the filter element 20 when the cover element 14 is closed. The engagement sections 76 shown in FIG. 2 have the shape of spring tabs and comprise an engagement surface 78 that extends substantially perpendicularly to the center longitudinal axis of the oil filter assembly. When the housing cover is opened, this engagement surface 78 acts against the edge 80 of the end cap 21 facing the engagement surface 78. For this reason, the filter element 20 can be removed from the supporting tube 22 when the cover element 14 is removed, and be removed from the receiving chamber 18. The engagement surfaces 78 are spaced apart from the lower edge 80 of the end cap 21 when the cover element 14 is closed for compensation for the axial play (shown in FIG. 2).

The engagement sections 76 have insertion slopes 82 on their radially inner lower side, which enable the engagement sections 76 to deviate in a radially outward direction when the cover element 14 is screwed on, and then snap in an axially inward direction when the engagement surfaces 78 pass the lower edge 80.

As is indicated in the section of FIG. 2.1, it is also possible to use engagement sections 76, which are designed as webs 84 provided in the form of cover elements. These engagement sections have radially outwardly extending recesses 86, which engage behind the end cap 21 in the finally assembled state.

We claim:

1. An oil filter assembly comprising:
   a housing having a receiving chamber, said housing also defining a drain opening;
   a filter element disposed in said receiving chamber, wherein oil passes through said filter element in a radial direction;
   a supporting tube fixed within said receiving chamber to support said filter element, said housing having means for securing said supporting tube in said receiving chamber to remain in said housing when said filter element is exchanged;
   a cover element cooperating with said housing to close said receiving chamber, said cover element having a supporting tube abutment area on a side thereof facing said receiving chamber, wherein, when said filter element is disposed on said supporting tube, said supporting tube is directly loaded by said supporting tube abutment area and displaced into an operating position while said receiving chamber is being closed, said supporting tube abutment area directly keeping said supporting tube in said operating position after said receiving chamber has been closed; and
   a spring element supported on one side thereof by said supporting tube and on an other side thereof by said housing, wherein said supporting tube is displaceably disposed in an axial direction between said operating position in which said receiving chamber is closed by said cover element and in which said supporting tube closes said drain opening and a drain position in which said supporting tube opens said drain opening as said receiving chamber is opened.

2. The oil filter assembly of claim 1, wherein said supporting tube projects past said filter element in a direction towards said cover element when said receiving chamber is closed and said filter element is disposed on said supporting tube.

3. The oil filter assembly of claim 1, wherein said supporting tube abutment area is formed by ribs that project in a radially inward direction and are disposed on an inner side of said cover element or webs that project in an axially downward direction, between which the oil that flows around the filter element can flow to a free end of said supporting tube.

4. The oil filter assembly of claim 1, wherein said cover element has a filter element abutment area on a side thereof facing said receiving chamber, wherein said filter element is directly displaced by said filter element abutment area into an operating position while said receiving chamber is being closed.

5. The oil filter assembly of claim 4, wherein said supporting tube abutment area and said filter element abutment area are located at different planes in an axial direction and/or said supporting tube abutment area is disposed on said cover element at a radially further inward position than said filter element abutment area.

6. The oil filter assembly of claim 1, wherein connecting pins are provided in a bottom of said receiving chamber, which extend in an axial direction and cooperate with pin recesses, which are disposed on feet that project in a radially outward direction or on a collar of said supporting tube, which projects in a radially outward direction and is circumferential at least in sections.

7. The oil filter assembly of claim 6, wherein at least sections of said feet or said collar are used as an abutment for a side of the filter element facing away from said cover element.

8. The oil filter assembly of claim 6, wherein said housing is made from plastic material, and said connecting pins are formed on said housing.

9. The oil filter assembly of claim 6, wherein said connecting pins have a widening proximate free ends thereof, wherein a separation between a bottom of said receiving chamber and a lower edge of said widening is at least slightly larger than an axial thickness of said feet or said collar.

10. The oil filter assembly of claim 9, wherein said widening is formed by hot riveting after insertion of said supporting tube and thereby of said pin recesses into said connecting pins.

11. The oil filter assembly of claim 9, wherein said pin recesses are formed such that said supporting tube can be rotated about its center longitudinal axis by at least a limited degree.

12. The oil filter assembly of claim 6, wherein said cover element has carrier sections that also rotate said supporting tube and/or said filter element at least to a limited degree when said cover element is turned.

13. The oil filter assembly of claim 1, wherein said supporting tube has an extension section on said side facing away from said cover element and in an area that is not covered by said filter element, which is closed in a radial direction, engages in a purified oil chamber having an oil outlet, and has at least one purified oil outlet opening in an area facing away from said cover element.

14. The oil filter assembly of claim 13, wherein said extension section has a circumferential sealing collar which projects in a radial direction and separates said receiving chamber from said purified oil chamber in an operating position.

15. The oil filter assembly of claim 13, wherein a free end of said supporting tube is provided with a closing section for closing said drain opening in said operating position.

16. The oil filter assembly of claim 15, wherein said spring element is disposed about said extension section in said purified oil chamber.

17. The oil filter assembly of claim 1, wherein a side of said cover element facing said receiving chamber is provided with engagement sections that engage behind filter element sections such that said filter element can be removed from said supporting tube by means of said cover element and extracted from said receiving chamber when said cover element is removed.

18. The oil filter assembly of claim 17, wherein said engagement sections have insertion slopes on a side facing said filter element such that, when said filter element is disposed onto said supporting tube and said cover element is subsequently closed, said engagement sections engage behind said filter element sections.

19. The oil filter assembly of claim 17, wherein said engagement sections are designed as spring tabs that project downwardly from said cover element substantially parallel to a center longitudinal axis of said filter element and have engagement surfaces for engaging behind said filter element sections.

20. The oil filter assembly of claim 17, wherein said engagement sections are formed by webs that are disposed on said cover element and extend substantially parallel to a center longitudinal axis of said filter element and have a recess that extends in a radial direction for engagement behind said filter element sections.

\* \* \* \* \*